(12) United States Patent
Kato et al.

(10) Patent No.: US 6,745,607 B2
(45) Date of Patent: Jun. 8, 2004

(54) HOT ROLLING THIN STRIP

(75) Inventors: Heiji Kato, Yokosuka (JP); Michael Angel Lopez, Dapto Heights (AU); John Albert Ziegelaar, Farmborough Heights (AU)

(73) Assignee: Castrip LLC, Charlotte, NC (US)

( * ) Notice: Subject to any disclaimer, the term of this patent is extended or adjusted under 35 U.S.C. 154(b) by 0 days.

(21) Appl. No.: 10/148,348

(22) PCT Filed: Nov. 30, 2000

(86) PCT No.: PCT/AU00/01477
§ 371 (c)(1),
(2), (4) Date: Aug. 20, 2002

(87) PCT Pub. No.: WO01/39905
PCT Pub. Date: Jun. 7, 2001

(65) Prior Publication Data
US 2003/0167818 A1 Sep. 11, 2003

(30) Foreign Application Priority Data
Dec. 1, 1999 (AU) .............................................. PQ4363

(51) Int. Cl.[7] .............................................. B21B 39/08
(52) U.S. Cl. .......................................... 72/205; 72/251
(58) Field of Search ........................ 72/8.6, 11.4, 205, 72/240, 245, 248, 250, 251; 164/442, 448

(56) References Cited

U.S. PATENT DOCUMENTS

| 4,291,562 A | * | 9/1981 | Orr .............................. 72/205 |
| 4,300,377 A | | 11/1981 | Hirata |
| 4,353,237 A | * | 10/1982 | Omori et al. .................. 72/205 |
| 4,602,966 A | | 7/1986 | Fukuoka et al. |
| 4,991,420 A | * | 2/1991 | Frischknecht et al. ........ 72/244 |
| 5,383,306 A | | 1/1995 | Michalon et al. |
| 5,778,717 A | * | 7/1998 | Berger et al. ................. 72/205 |

FOREIGN PATENT DOCUMENTS

| JP | 55-106619 | 8/1980 |
| RU | 858955 | 8/1981 |
| RU | 2058840 | 4/1996 |
| SU | 858-955 | 8/1981 |

* cited by examiner

Primary Examiner—Ed Tolan
(74) Attorney, Agent, or Firm—Barnes & Thornburg

(57) ABSTRACT

A thin steel strip is passed through a pinch roll stand comprising pinch rolls to a hot rolling mill comprising work rolls and backing rolls. In advance of rolling mill, the strip passes over support rolls. An anti-crimping guide roll located immediately in advance of the rolling mill is mounted on a pair of rocker structures so as to be rasiable from a lower inoperative position to lift the strip out of a straight line path so as to pass around the anti-crimping roll and to be wrapped about the upper work roll, that roll supports the strip and resists buckling of the strip and the generation of crimping defects.

17 Claims, 2 Drawing Sheets

HOT ROLLING THIN STRIP

CROSS-REFERENCE TO RELATED APPLICATIONS

This application is a U.S. national counterpart application of international application Ser. No. PCT/AU00/01477 filed Nov. 30, 2000, which claims priority to Australian application Ser. No. PQ 4363 filed Dec. 1, 1999.

BACKGROUND AND SUMMARY OF THE INVENTION

This invention relates to the hot rolling of thin strip. It has particular, but not exclusive, application to in-line hot rolling of thin steel strip produced by a twin roll strip caster.

Recent developments in twin roll strip casting has enabled steel strip to be produced to thicknesses of the order of 5 mm or less. Such strip can be further reduced in thickness by reduction in an in-line hot rolling mill as it is produced by the caster. It has been found that when hot rolling strip to a thickness of the order of 3 mm or less significant defects can be generated in the strip due to crimping of the strip material on entry to the reduction rolls. Such crimping defects may be relatively minor and appear as curved lines seen on the surface of the strip. However, particularly when rolling very thin strip, the crimped parts of the strip may become folded over prior to rolling so that parts of the strip become heavily reduced and split with resulting very severe defects.

Crimping defects arise due to variations in the strip reduction across the width of the strip. Typically, the centre part of the strip will be subjected to higher percentage reduction than the strip edges depending on incoming strip profile. The centre parts of the strip will therefore be subject to lengthwise compression whereas the edges will be subjected to tension. This results in backwards slip of the central portion of the strip relative to the edges. The centre of the strip is thus pushed back relative to the edges to create buckling. The buckles are then rolled into the strip to create marks on the surface. In extreme cases the strip may completely fold over at the buckles and the folded over material is rolled in to produce severe defects. Variations in strip reduction across the strip width can be localised to small parts of the strip width. This can result in localised crimping of the strip. The extent of the crimping is related to the size of the difference in reduction across the strip width and the size of the strip width affected by the difference in reduction.

Crimping of the strip is affected by strip tension and in some applications it is possible to control crimping defects by using high strip tension. However it is not always feasible to use higher tension in very thin strip at high temperatures. It is also difficult to apply high tensions to strip exiting a strip caster since little or no tension can be applied to the strip exiting the casting mould. The strip may hang in a free loop and be in a low tensioned state prior to passing to an in-line rolling mill. The present invention provides a method and apparatus by which crimping defects can be substantially controlled without the need for high strip tension.

According to the invention there is provided a method of hot rolling thin steel strip comprising feeding the strip through a nip between a pair of work rolls and applying strip squeezing forces between the work rolls, wherein the strip is passed in advance of the work rolls around a guide roll which causes the strip to be wrapped onto one of the work rolls in advance of its entry into the nip between the work rolls.

Preferably the strip is wrapped around said one work roll through an angle of wrap of at least 10°. The angle of wrap may for example be in the range 20° to 45°.

Preferably the work rolls are disposed one above the other. In that case said guide roll may be positioned to guide the strip upwardly from a horizontal path to the nip and then downwardly about the upper work roll in advance of the nip.

The invention also provides strip rolling apparatus comprising;

a pair of work rolls defining a nip between them to receive a strip to be rolled, means to apply squeezing forces between the work rolls, and a guide roll to guide a strip to the nip between the work rolls such that the strip is wrapped onto one of the work rolls in advance of its entry into the nip.

Preferably the work rolls are disposed one above the other and the guide roll is movable from a lowered position in which strip can pass above it in a horizontal path to the nip between the work rolls and a raised operative position in which it lifts the strip above said horizontal path to cause the strip to be wrapped onto the upper work roll in advance of the nip.

BRIEF DESCRIPTION OF THE DRAWINGS

In order that the invention may be more fully explained one particular embodiment will be described in some detail with reference to the accompanying drawings in which.

DETAILED DESCRIPTION OF THE DRAWINGS

Figure 1:
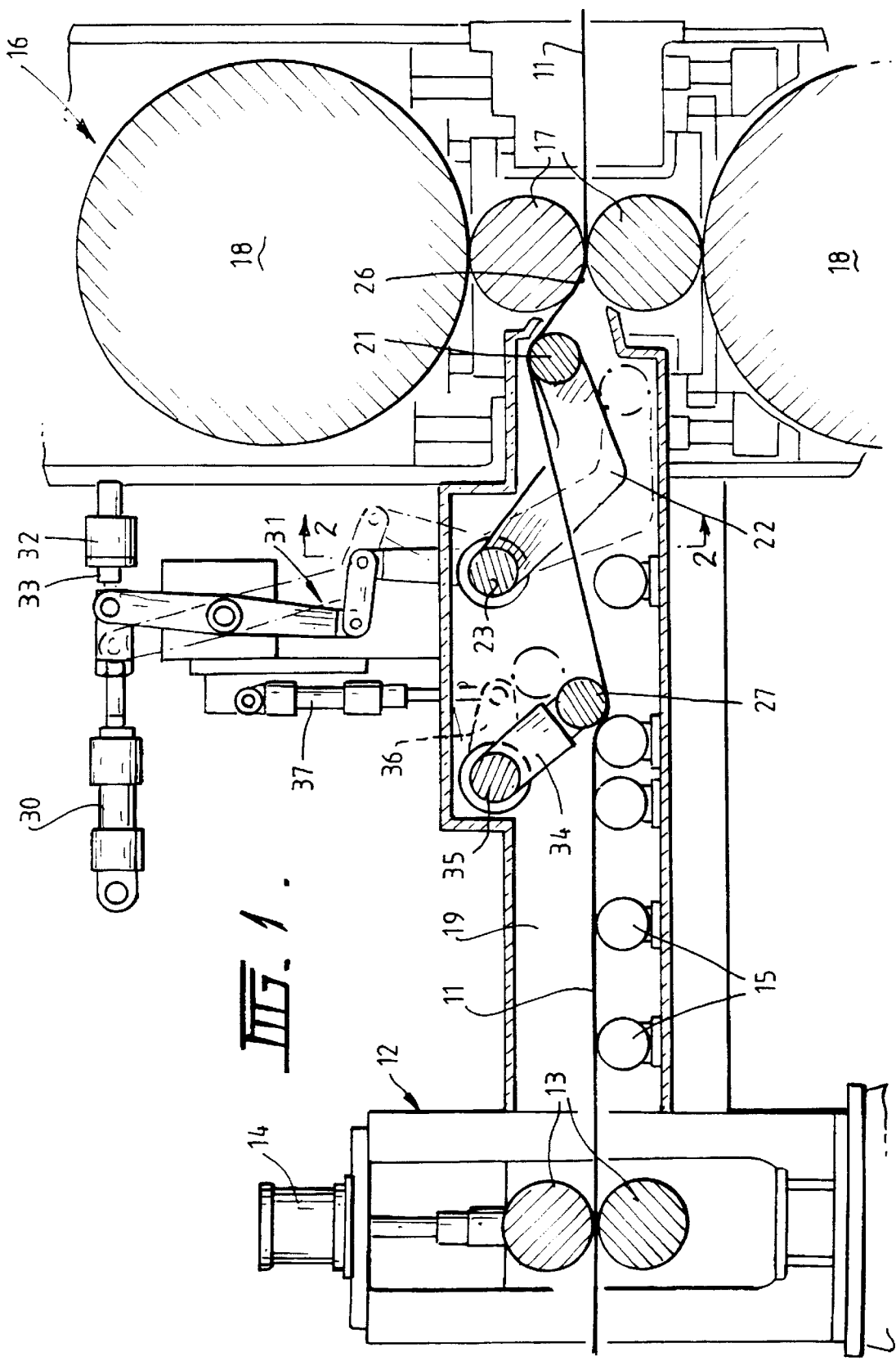
FIG. 1 illustrates part of a strip mill installation for rolling thin steel strip.
Figure 2:
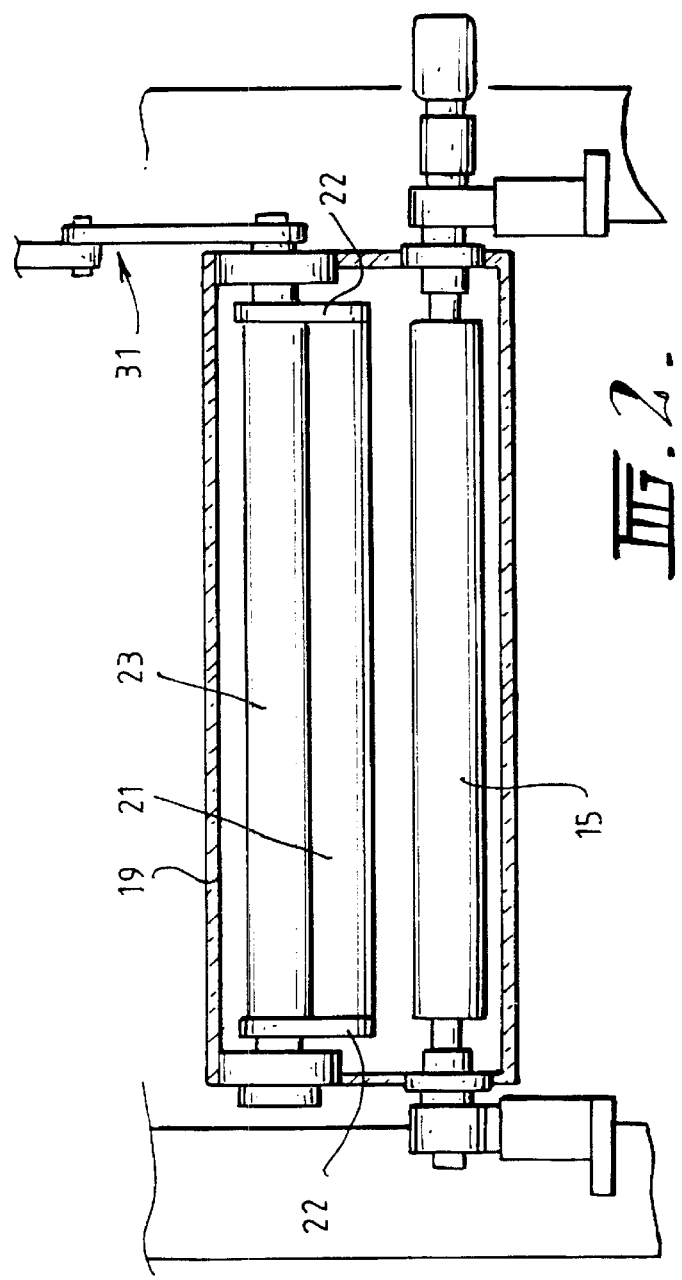
FIG. 2 is a cross-section on the line 2—2 in FIG. 1.
Figure 3:
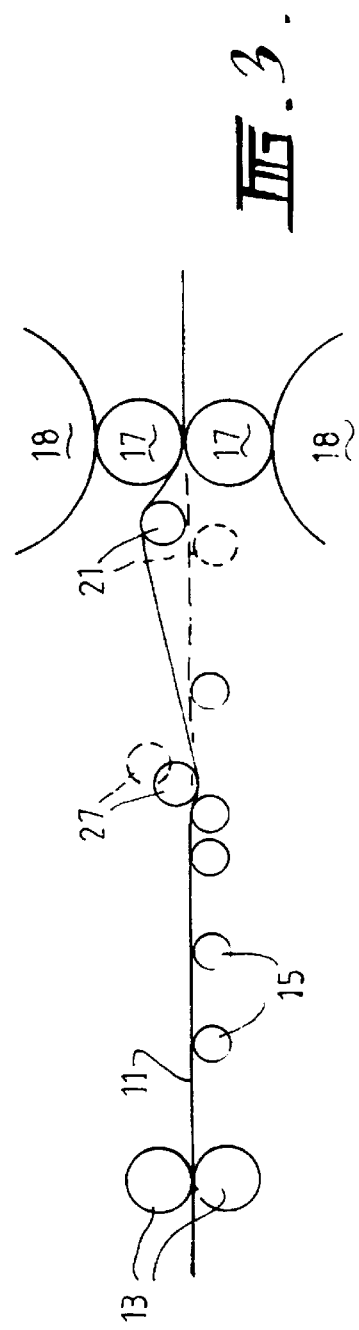
FIG. 3 diagrammatically illustrates the operation of an anti-crimping roll incorporated in the installation.

In the illustrated rolling mill installation a thin steel strip 11 is passed through a pinch roll stand 12 comprising a pair of pinch rolls 13 to which strip gripping forces are applied by a pair of hydraulic cylinder units 14 disposed one to each side of the pinch roll stand.

After passing through pinch roll stand 12 the strip 11 is supported on a table formed by a succession of rollers 15 across which it passes to a rolling mill 16 comprising a pair of work rolls 17 disposed one above the other and a pair of upper and lower backing rolls 18. Strip reduction forces are applied between the work rolls 17 by means of hydraulic cylinder units (not shown) disposed at the two sides of the rolling mill and acting through the upper backing rolls 18. Between pinch roll stand 12 and rolling mill stand 16, the strip is held within a sealed enclosure 19.

In accordance with the present invention the installation includes an anti-crimping guide roll 21 located immediately in advance of the rolling mill 16 and mounted on a pair of rocker structures 22 which can be pivoted on horizontal pivot shaft 23 by actuation of a hydraulic cylinder 30 which acts on the rocker structures through a mechanical linkage mechanism 31 so as to enable the anti-crimping roll to be raised and lowered. The anti-crimping roll 21 has a lowered inoperative position (indicated by dotted lines in FIG. 1) in which the strip can be passed horizontally directly into the nip 26 between the work rolls 17 of the rolling mill. The anti-crimping roll 21 can then be raised by operation of the hydraulic cylinder 30 to lift the strip out of its straight line horizontal path so as to pass around the anti-crimping roll and to be wrapped about the upper work roll 17 in advance of the nip 26.

The anti-crimp roll pivot shaft 23 is supported on bearing mounts in the side walls of enclosure 19 and one end that shaft extends through a rotary seal to connect with the linkage mechanism 31 so that the shaft is rotated by the linkage mechanism 31 on operation of hydraulic cylinder 30. The effective stroke of hydraulic cylinder 30 can be adjusted by operation of an electric screwjack 32 to set a stop 33 in order to adjust the height of the anti-crimp roll 21 in its raised position.

In order to hold the strip down on the table rolls 15 when the anti-crimping roll 21 is raised, an upper pass line roll 27 is brought downwardly to engage the strip immediately after one of the table rolls 15. Roll 27 is mounted on rocker arms 34 which extend from a pivot shaft 35 connected at one end to a lever arm 36 located outside enclosure 19 and actuable by a hydraulic cylinder 37 to rotate shaft 35 there by to raise and lower the upper pass line roll 27.

It has been found that the anti-crimping roll is most effective in practice to reduce crimping defects even in very thin strip. Due to the wrapping of the strip around the upper work roll the work roll supports the strip and resists buckling of the strip. The curvature of the strip around the top work roll can also increase the resistance to transverse buckling of the strip in the critical region in advance of the roll nip due to the effectively curved shaping of the strip in that region.

It has been found that for most effective anti-crimping action, the strip should be wrapped about the upper work roll through an angle of at least 10° and preferably in the range 20° to 45°. In a typical installation the work rolls may have a diameter in the range 400 mm to 700 mm and the anti-crimp roll may be positioned to raise the strip to a height of between 150 mm to 250 mm above a horizontal plane through the nip between the work rolls.

While hydraulic cylinders have been disclosed above for providing gripping and reduction forces respectively for the pinch rolls 13 and the work rolls 17, those skilled in the art will recognize that spring units, servo mechanisms or other suitable devices may be substituted alone or in combination.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. In a method of producing thin steel strip by continuous casting in a twin-roll strip caster to a thickness of 5 mm or less and reducing the thickness in an in-line hot rolling mill as it is produced by the caster through a nip between a pair of work rolls of the rolling mill, the improvement comprising the steps of:

passing the cast strip in advance of the work rolls around a guide roll which causes the strip to be wrapped onto one of the work rolls in advance of its entry into the nip between the work rolls, and reducing strip defects arising during hot rolling due to backwards slipping of the central portion of the strip relative to the edges caused by variation in strip reduction across the width of the strip.

2. The method as claimed in claim 1, wherein the strip is wrapped around said one work roll through an angle of wrap of at least 10°.

3. The method as claimed in claim 2, wherein the work rolls are disposed one above the other.

4. The method as claimed in claim 1, wherein the angle of wrap is in the range of 20° to 45°.

5. The method as claimed in claim 4, wherein the work rolls are disposed one above the other.

6. The method as claimed in claim 5, wherein said guide roll is positioned to guide the strip upwardly from a horizontal path to the nip and then downwardly about the upper work roll in advance of the nip.

7. The method as claimed in claim 6, wherein said guide roll is to positioned to guide the strip upwardly from a horizontal path to the nip and then downwardly about the upper work roll in advance of the nip.

8. The method as claimed in claim 1, wherein the work rolls are disposed one above the other.

9. The method as claimed in claim 8, wherein said guide roll is positioned to guide the strip upwardly from a horizontal path to the nip and then downwardly about the upper work roll in advance of the nip.

10. An apparatus for producing thin steel strip the apparatus comprising a twin roll strip caster operable to continuously cast steel strip to a thickness of 5 mm or less and a hot rolling mill installed in-line with the strip caster and operable to reduce the thickness of the strip by hot rolling the strip the rolling mill comprising a pair of work rolls defining a nip between them to receive the strip as it is produced by the caster, the improvement comprising:

a bias unit configured to apply squeezing forces between the work rolls, and a guide roll to guide the strip to the nip between the work rolls such that the strip is wrapped onto one of the work rolls in advance of its entry into the nip between work rolls.

11. The apparatus as claimed in claim 10, wherein the guide roll is positionable to guide the strip such that the strip is wrapped onto said one work roll through an angle of wrap of at least 10°.

12. The apparatus as claimed in claim 10, wherein the guide roll is positionable to guide the strip such that the strip is wrapped onto said one work roll through an angle of wrap in the range 20° to 45°.

13. The apparatus as claimed in claim 10, wherein the work rolls disposed one above the other and the guide roll is movable from a lowered position in which strip can pass above it in a horizontal path to the nip between the work rolls and a raised operative position in which it lifts the strip above said horizontal path to cause the strip to be wrapped onto the upper work roll in advance, of the nip.

14. The apparatus as claimed in claim 10, wherein the work rolls are disposed one above the other and the guide roll is movable from a lowered position in which strip can pass above it in a horizontal path to the nip between the work rolls and a raised operative position in which it lifts the strip above said horizontal path to cause the strip to be wrapped onto the upper work roll in advance of the nip.

15. The apparatus as claimed in claim 10, wherein the bias unit comprises a hydraulic cylinder.

16. The apparatus as claimed in claim 10, wherein the bias unit comprises a spring.

17. The apparatus as claimed in claim 10, wherein the bias unit comprises a servo mechanism.

* * * * *